W. P. Eayrs,

Beer Pitcher,

No. 55,076. Patented May 29, 1866.

Witnesses:

Inventor:

UNITED STATES PATENT OFFICE.

WINSLOW P. EAYRS, OF NASHUA, NEW HAMPSHIRE.

IMPROVED BEER-PITCHER.

Specification forming part of Letters Patent No. 55,076, dated May 29, 1866.

*To all whom it may concern:*

Be it known that I, WINSLOW P. EAYRS, of Nashua, Hillsborough county, State of New Hampshire, have invented a new and Improved Beer-Pitcher; and I do hereby declare that the following is a full, clear, and exact description thereof, which will enable others skilled in the art to make and use the same, reference being had to the accompanying drawings, forming part of this specification.

In drawing ale, beer, porter, and other fermented liquors from casks or the like, the pitcher or vessel into which it is drawn is nearly always filled two-thirds full of froth, and in pouring the liquor out into the tumblers more or less froth is sure to fall into the glass, and thus considerable time is consumed in waiting for the liquor to settle, in order to fill up the glasses, as well as the pitcher itself.

The object of my invention is to remedy this difficulty; and it consists in constructing a pitcher or other vessel into which the liquor is drawn from the cask with a partition-plate dividing off a chamber or space in front of the spout, said division wall or plate extending down nearly to the bottom of the pitcher; also, in the employment of perforated plates placed horizontally across the pitcher, which are intended to serve as strainers or condensers; also, providing the pitcher with a V-shaped mouth, open at its bottom, for conducting the liquor to the top strainer.

Figure 1:
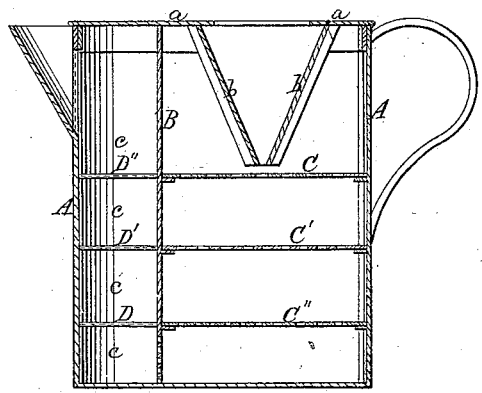
Figure 2:
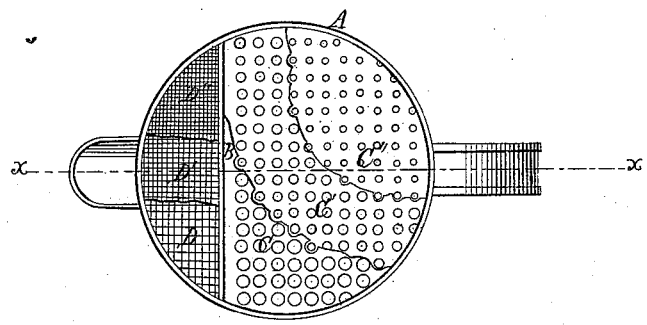

In the accompanying drawings, Figure 1 is a longitudinal vertical section of my invention, taken in the plane of the line $xx$, Fig. 2. Fig. 2 is a plan or top view of the same, a portion of each plate being broken away to expose that below it.

Similar letters of reference indicate like parts.

A designates a metallic pitcher intended to hold beer, ale, porter, or any other fermented liquor, which I here illustrate to show the application of my invention; but I do not limit myself to the form of pitcher shown, as any other shape will answer as well. The said pitcher is provided with a cover, $a$, (see Fig. 1,) having an opening in its top, from which opening there project downward two inclined plates, $b\ b$, which approach near to each other at their lower ends. This is intended as the mouth of the vessel for receiving the liquor as it is drawn out of the cask.

B is a partition-wall which extends longitudinally down the vessel, dividing off a space or chamber, $c$, in front of the spout, and at its lower end there is made a hole, or it is perforated in any suitable way, to permit the liquor, when the pitcher is turned, to flow from the body of the pitcher into the chamber $c$, from which latter it may be delivered through the spout.

C C' C'' are perforated plates placed across the body of the pitcher. They serve the purpose of strainers or condensers of the frothy liquor. There may be as many of these perforated plates as desired, and it is well to have the perforations decrease in size from the top to the bottom of the pitcher, as shown more particularly in Fig. 2. The plate C has the largest perforation in it, and the plate C'' the smallest.

D D' D'' are also perforated plates extending horizontally across the chamber $c$, between the division-plate B and the front of the pitcher. The plate D, which is at the bottom, has the largest perforations through it, and the plate D'', which is at the top, the smallest.

It will be seen that when the liquor is drawn from the cask and allowed to flow into a pitcher constructed as above described the froth is caused slowly to fall upon first one perforated plate and then the next, and so on to the bottom of the pitcher, and then when it is desired to pour out the liquor it cannot reach the spout of the pitcher without passing through all the plates in the chamber, and therefore by the time the liquor has reached the spout of the pitcher it is entirely free from froth.

What I claim as new, and desire to secure by Letters Patent, is—

The arrangement of the divisional plate B, perforated plates C C' C'' D D' D'', as described, and mouth $b\ b$, in combination with the pitcher A, constructed and operating in the manner and for the purpose herein specified.

WINSLOW P. EAYRS.

Witnesses:
MARK R. HOLT,
JOSEPH GREELEY.